United States Patent

[11] 3,568,174

[72] Inventors George V. Jacoby
Bala-Cynwyd, Pa.;
Joseph D. Gleitman, Camden, N.J.
[21] Appl. No. 713,459
[22] Filed Mar. 15, 1968
[45] Patented Mar. 2, 1971
[73] Assignee RCA Corporation

[54] COMPENSATED READBACK CIRCUIT
10 Claims, 5 Drawing Figs.

[52] U.S. Cl. .......... 340/174.1, 179/100.2
[51] Int. Cl. .......... G11b 5/44, G11b 5/00
[50] Field of Search .......... 340/174.1 (B), 174.1 (G), 174.1 (H); 179/100.2 (K); 346/74 (M)

[56] References Cited
UNITED STATES PATENTS
2,657,276 10/1953 Eliot et al. .......... 179/100.2
3,146,430 8/1964 Burke .......... 340/174.1

*Primary Examiner*—James W. Moffitt
*Assistant Examiner*—William F. White
*Attorney*—H. Christoffersen

ABSTRACT: In high performance data recording and readback systems, both forward direction and reverse direction reading of the storage medium occurs. The readback signals derived from reading in either direction are phase compensated to make the self-timing clock signal extracted therefrom more accurate.

INVENTORS
GEORGE V. JACOBY &
JOSEPH D. GLEITMAN
By John T. O'Halloran
Attorney

INVENTORS
GEORGE V. JACOBY &
JOSEPH D. GLEITMAN
BY John T. O'Halloran
ATTORNEY

COMPENSATED READBACK CIRCUIT

BACKGROUND OF THE INVENTION

To obtain high performance from polarizable storage systems, such as magnetic tape stations or discs, dielectric recording mediums, and the like, a large amount of digital data is densely packed on the recording medium and the medium is read rapidly in either the forward or reverse directions. The high packing densities are obtained by utilizing various types of recording codes, such as a nonreturn-to-zero recording code (NRZ), a Manchester phase-modulated recording code, a frequency doubling recording code, or the like. The common feature of such recording codes is that a transition in polarization in the polarizable storage medium conveys the significant information. Such types of recorded signals are frequently processed to provide a self-timing or clock signal. Such a clock signal eliminates the necessity of providing either an external clock signal generator or a special timing track on the medium. However, one difficulty encountered in such high performance recording systems is that the readback signal derived from reading in the forward direction differs from the readback signal derived from reading in the reverse direction. Both types of readback signals contain phase distortions that are a result of the inherent limitations of both the recording and reading processes in such storage systems. These phase distortions are further aggravated by the wear of the transducer, such as the magnetic read/write heads in magnetic tape stations. Such normal wear when added to the impossibility of providing a perfect mechanical system, accentuates the differences in the forward and the reverse readback signals. The result is that the transducers have to be replaced more frequently than desirable if misreadings are to be avoided. This is particularly true when the transducers are made of Mu metal, as is the case in many magnetic tape stations.

SUMMARY OF THE INVENTION

A readback circuit for reading in both the forward and reverse directions, the data stored on a polarizable storage medium, comprises first means that are coupled to shift the phase of the forward readback signal in one sense to compensate for phase distortion in the forward readback signal. Second means are coupled to shift the phase of the reverse readback signal in an opposite sense to that of the phase shift of the forward readback signal to compensate for the phase distortion in the reverse readback signal.

DETAILED DESCRIPTION

Figure 1:
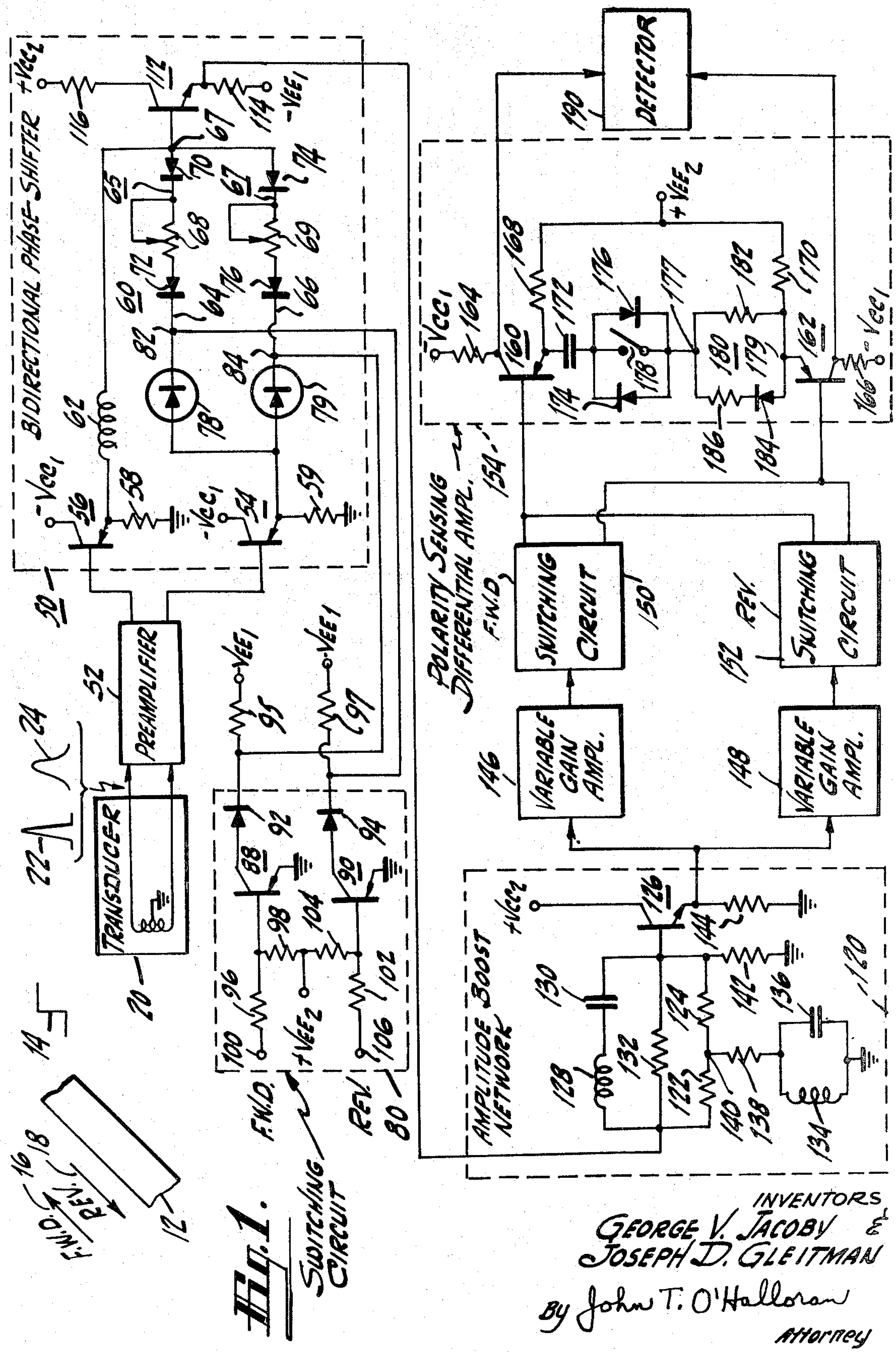
FIG. 1 is a schematic block diagram of a readback circuit embodying the invention.

In FIG. 1 there is shown a readback system 10 that compensates for phase distortion in the readback signals derived from reading in either the forward or reverse directions of a polarizable storage medium 12. The polarizable storage medium may, for example, comprise a magnetic, a dielectric, or other polarizable storage mediums and may consist of a tape, a disc, a drum, or the like. For the purpose of this specification, it will be assumed that the polarizable storage medium 12 is a tape that is coated with a magnetic material and is incorporated into a magnetic tape station. It is also assumed that the storage medium 12 stores informational data in binary form. The data is recorded on the tape 12 by step changes in the current in the write head. These step changes in current cause transitions in polarization of the magnetic surface, such as shown by the transition 14 in FIG. 1.

During readback, a readback pulse is provided by each transition step 14. During readback, the medium 12 is moved in the forward direction as denoted by the arrowhead 16 in FIG. 1 or in the reverse direction as denoted by the arrowhead 18. Recording is done in the forward direction only and this defines the forward direction. During readback, the transition step 14 may, for example, produce a positive-going readback pulse. A pulse of opposite polarity is derived from a transition opposite to that of the transition 14. A magnetic transducer head 20 is positioned adjacent the polarizable storage medium 12 and the movement of the storage medium 12 in either the forward or reverse directions cause each transition in polarization to produce a readback pulse in the transducer head 20. Ideally, the magnetic transducer head 20 functions as a differentiator that produces a spike pulse for each transition 14, such as shown by the pulse 22 in FIG. 1. However, the inherent imperfections in recording systems actually causes a pulse similar to the pulse 24 to be produced. It is apparent that the readback pulse 24 is much wider than the spike pulse 22.

Figure 2:
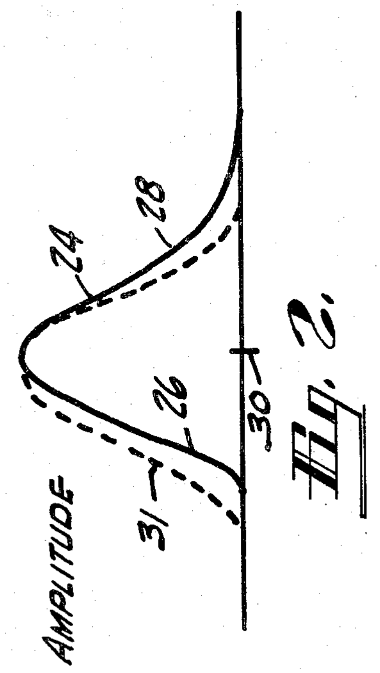

Referring to FIG. 2, an enlarged view of the pulse 24 is shown. The pulse 24, shown in solid line in FIG. 2, is derived from reading the transition 14 when the tape 12 is moved in the forward direction 16. It is to be noted that this forward readback pulse 24 includes a leading edge 26 that rises much more sharply than the trailing edge 28 thereof. This asymmetry about a center point 30 in the forward readback pulse 24 is the result of the phase distortions in the readback process. Phase distortion, or nonlinear phase shifting, results in asymmetry in the readback pulses. Such asymmetry creates difficulties when data is packed densely because inaccurate timing can result. The self-timing clock signal may, for example, be extracted from the peaks in the readback signal. Without proper compensation, the interaction between asymmetrical pulses in the readback signal, such as pulse 24, causes displacement of the peaks which result in timing errors. A readback pulse that is symmetrical about the center point 30 is shown by the dotted pulse 31 superimposed on the pulse 24 in FIG. 2. Such a symmetrical pulse 31 is derived from a readback system that exhibits an ideal linear phase shift characteristic, such as shown by the straight line characteristic 32 in FIG. 4. A readback pulse, such as pulse 31 is symmetrical because no nonlinear phase shifting has occurred. Symmetrical pulses 31 permit accurate informational data to be extracted from the readback signal.

Figure 4:
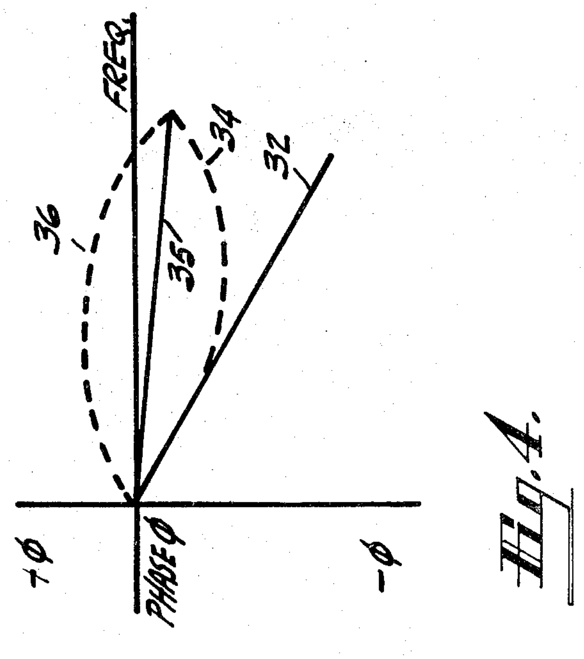

An uncorrected readback system exhibits the nonlinear phase characteristic shown by the dashed curve 34 in FIG. 4. Consequently, a compensating phase shift must be introduced into the system 10 to compensate for this nonlinearity. The phase compensation introduced exhibits the characteristic 36 shown dashed in FIG. 4. The characteristic 36 is the mirror image of the uncorrected curve 34 and introduces a phase shift of an opposite sense to that of the characteristic 34. Consequently, both curves combine to produce a resultant overall phase characteristic 35 that is linear, as required. The linear phase characteristic 35 differs from the linear characteristic 32 only in introducing a different delay into the readback signal. The phase characteristic 35 provides an overall linear phase shift characteristic for the system 10 only in the forward direction of rotation of the tape 12.

Figure 3:
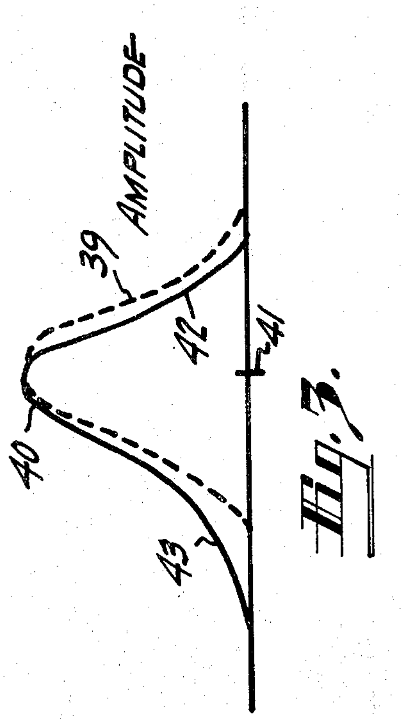
FIGS. 2 and 3 are graphic illustrations of the pulses derived from reading a single transition in polarization of the polarizable storage medium of FIG. 1.
Figure 5:
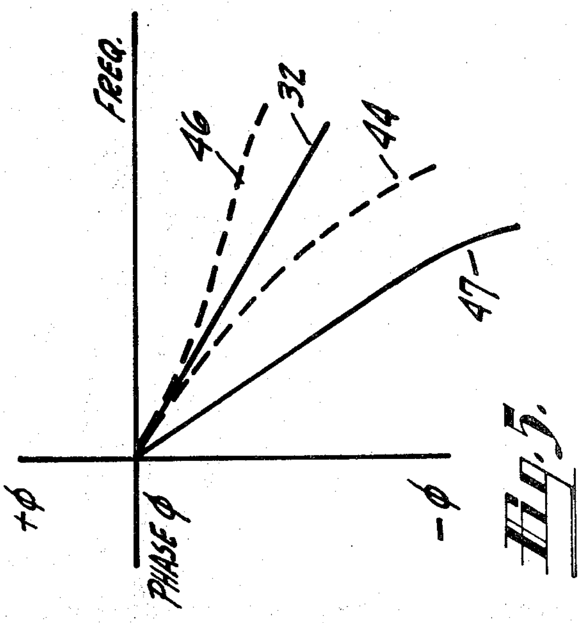
FIGS. 4 and 5 are graphic illustrations of the phase compensation needed to restore the symmetry in the forward and reverse readback pulses.

The introduction of such a compensating phase shift into the readback circuit 10 solves the problem of phase distortion in the forward direction. When the storage medium 12 is run in the reverse direction, a reverse readback pulse 40, as shown in FIG. 3 is derived from a transition opposite to the transition 14. The pulse 40 is also asymmetrical about a center point 41, but in this instance, the trailing edge 42 is sharper than the leading edge 43. In the reverse direction, an uncorrected readback system exhibits the nonlinear characteristic 44, shown dashed in FIG. 5. This nonlinear phase characteristic 44 is essentially opposite to that of the nonlinear phase characteristic 34 for the forward direction. Consequently, the introduction of the forward direction phase compensation curve 36 of FIG. 4 would merely aggravate the existing distortion in the reverse direction. Accordingly, the phase shift characteristic 46, shown dashed in FIG. 5, is introduced into the system 10 to derive an overall substantially linear phase characteristic 47. Accordingly, a bidirectional phase shift network 50 is incorporated into the readback circuit 10 to introduce different phase shifts into the system 10 in the forward and the reverse directions of operation.

Referring back to FIG. 1, the double-ended readback signals derived from the transducer 20 are amplified in a linear preamplifier 52 before application to the bidirectional phase shifter circuit 50. The bidirectional phase shifter circuit 50 includes transistors 54 and 56, each having a base electrode coupled to an opposite terminal of the double ended output of the preamplifier 52 to operate a push pull. Each of the transistors 54 and 56 is connected to operate as an emitter follower to provide a low source impedance to a pair of unidirectional phase shift circuits 60 that include a common reactive circuit element 62 and a pair of parallel resistive branches 64 and 66. The reactive circuit element 62 and the branch 64 comprise a forward directional phase shift circuit 65 whereas the reactive circuit element 62 and the branch 66 comprise a reverse direction phase shift circuit 67.

The emitter electrodes of the transistors 54 and 56 are coupled through resistors 58 and 59, respectively to a point of reference potential, or ground, in the circuit, and the collector electrodes are each coupled to a source of energy or power supply $-V_{CC_1}$. The pair of phase shift circuits 60 are serially connected between the emitters of the transistors 54 and 56. The reactive element 62 may, for example, comprise either an inductor or a capacitor. An inductor is shown in FIG. 1 and the inductor is coupled between the emitter of the transistor 56 and one end junction 67 of the parallel resistive branches 64 and 66. The branch 64 includes a variable resistance or potentiometer 68 connected between similarly poled isolating diodes 70 and 72. This serial combination is coupled through an oppositely poled stabistor diode 78 to the emitter of the transistor 54. Similarly, the branch 66 includes a potentiometer 69 connected between similarly poled isolating diodes 74 and 76 and this serial combination is coupled through an oppositely poled stabistor diode 79 to the emitter of the transistor 54. Thus both the branches 64 and 66 are coupled in parallel between the junction point 67 and the emitter of the transistor 54. The forward 65 and reverse 67 phase shift circuits each in combination with an amplitude boost circuit 120 introduce the correct phase shifts into the readback system 10 to cause the readback system 10 to exhibit the corrected phase characteristics 35 and 47 of FIGS. 4 and 5, respectively. The potentiometer 68 in the forward phase shift circuit is adjusted to have a large resistance and the potentiometer 69 in the reverse direction phase shift circuit 67 is adjusted to have a small resistance.

Only one of the unidirectional phase shift circuits 65 or 67 is connected into the bidirectional phase shift network 50 at any one time. Accordingly, a forward/reverse switching circuit 80 is included in the readback circuit 10 to determine whether the forward direction phase shift circuit 65 or the reverse direction phase shift circuit 67 is switched into the readback circuit 10. This switching is accomplished by controlling the potential level of the points 82 and 84 in the parallel resistive branches 64 and 66, respectively. The switching circuit 80 includes transistors 88 and 90 each having an emitter electrode coupled to ground and a collector electrode coupled through forwardly poled diodes 92 and 94 and resistors 95 and 97, respectively, to a power supply $-V_{EE_1}$. The power supply $-V_{EE_1}$ is less negative than the power supply $-V_{CC_1}$. The cathodes of the diodes 92 and 94 are also connected to the junction points 84 and 82, respectively. The transistor 88 is biased by coupling the base electrode thereof to the junction point of a pair of voltage divider resistors 96 n and 96 t98 that are serially coupled between an input terminal 100 and a power supply $+V_{EE_2}$. The input terminal 100 receives a forward direction signal when the storage medium is driven in the forward direction. Similarly, the transistor 90 is biased by coupling the base electrode thereof to the junction point of a pair of voltage divider resistors 102 and 104 serially coupled between a second input terminal 106 and the power supply $+V_{EE_2}$. The input terminal 106 receives a reverse direction signal when the storage medium 12 is driven in the reverse direction.

Phase shifted readback signals are derived from the junction 67 of the inductor 62 and the parallel resistive branches 64 and 66 and the signals are applied to the base electrode of an emitter follower transistor 112. The transistor includes an emitter that is coupled through a resistor 114 to the power supply $-V_{EE_1}$ as well as a collector that is coupled through resistor 116 to a power supply $+V_{CC2}$. The emitter electrode of the transistor 112 is coupled to the input of an amplitude boost network 120. The amplitude boost network, or amplitude compensator 120 may, for example, comprise a bridge -T network that includes a pair of resistors 122 and 124 that are serially coupled from the emitter of the transistor 112 to the input base electrode of an output transistor 126. Shunting the resistors 122 and 124, is the serial combination of an inductor 128 and a capacitor 130 that is resonant at a frequency near the upper limit of the frequency range of operation of the readback system 10. Shunted across the inductor 128 and capacitor 130 is a resistor 132. The parallel combination of an inductor 134 and a capacitor 136 are connected from ground through a resistor 138 to the junction 140 of the resistors 122 and 124 The inductor 134 and capacitor 136 are selected to exhibit a parallel resonance frequency substantially equal to the resonant frequency of the inductor 128 and capacitor 130. A resistor 142 is also coupled between the input base electrode of the transistor 126 and ground. The collector electrode of the transistor 126 is coupled to the power supply $+V_{CC_2}$ and the emitter electrode thereof is coupled through a resistor 144 to ground. The amplitude booster network 120 boosts the amplitude of the high frequency components of the readback signal more than the low frequency components thereof and by doing this, the readback signal after amplitude boosting is slimmer than before boosting. This slimming process corrects for amplitude distortions due to intersymbol interference caused by pulse crowding in very high density recording systems. Additionally, the amplitude boost network 120 also introduces a phase shift that combines with the phase shifts introduced by the forward 65 and reverse 67 phase shift circuits to provide the overall phase characteristics 35 and 47 in the forward and reverse directions of operation, respectively.

The phase and amplitude compensated signals derived from the amplitude compensator 120 are applied to variable gain control amplifiers 146 and 148. The amplifier 146 comprises the gain control amplifier for the forward readback signal, whereas the amplifier 148 is the gain control amplifier for the reverse readback signal. The amplifiers 146 and 148 are adjusted to cause the forward and reverse readback signals to exhibit equal amplitude levels.

The outputs of the variable gain amplifiers 146 and 148 are applied to directional switches 150 and 152, respectively. The switch 150 is closed only when a forward direction read signal is applied thereto, whereas the switch 152 is closed only when a reverse direction read signal is applied thereto. Thus only one of the switches 150 and 152 is closed at any one time.

Both the output of the switching circuit 150 and the output of the switching circuit 152 are applied to a polarity sensing differential amplifier 154. The polarity sensing differential amplifier 154 causes the negative and positive swings of a readback signal to exhibit the same amplitude. The negative and positive swings of a readback signal do not exhibit the same amplitude because the erase current causes a more intense magnetization in one direction than in the other direction. The polarity sensitive differential amplifier 154 therefore amplifies one-directional swings, e.g., the negative swings, of both the forward and reverse readback signals more than the positive swings of these signals. The polarity sensing differential amplifier includes a pair of transistors 160 and 162 having collector electrodes coupled through the resistors 164 and 166, respectively to the power supply $-V_{CC_1}$. The emitter electrodes of the transistors 160 and 162 are coupled through resistors 168 and 170, respectively to a power supply $+V_{EE_2}$.

A capacitor 172, which is an alternating current short, is coupled from the emitter of the transistor 160 to the junction of a pair of oppositely poled diodes 174 and 176. A single-pole single-throw switch 178, which may be a transistor switch, is shunted across the parallel pair of diodes 174 and 176. The function of the diodes 174 and 176 and switch 178 will be described subsequently. The other junction of the pair of diodes 174 and 176 is coupled to one terminal 177 of a gain control network 180, the other terminal 179 of which is coupled to the emitter electrode of the transistor 162. The gain control network includes two parallel branches with one branch including a single resistor 182 and the other branch including a diode 184 connected in series with a resistor 186. The diode 184 is poled such that the anode thereof is coupled to the emitter electrode of the transistor 162. The output of the amplifier is derived from across the collectors of the transistors 160 and 162.

The gain control network 180 causes the amplifier 154 to amplify negative signals more than positive signals. Assuming that the switch 178 is closed and shorts out the diodes 174 and 176, a positive signal applied to the amplifier 154 causes the emitter electrode of the transistor 160 to be more positive than the emitter electrode of the transistor 162. Consequently, the diode 184 is reverse biased and no current flows through the resistor 186. Consequently, only the resistor 182 determines the gain of the amplifier. When the input signal to the base electrode of the transistor 160 swings negative, the greater conduction through the transistor 160 causes the emitter electrode thereof to become more negative than the emitter of transistor 162 and the diode 184 becomes forward biased. Therefore current flows through the parallel resistors 182 and 186 and the pair determines the gain of the amplifier 154. Consequently, the gain is higher for negative than for positive signals.

When the switch 178 is opened, the oppositely poled diodes 174 and 176 prevent conduction therethrough of low level signals below the "knee" of the transfer characteristic of the diodes. For higher level signals, conduction occurs. The effect of the diodes 174 and 176 is to clip baseline noise signals. However, the diodes are only included in the circuit when peak detection is utilized to extract self-timing clock signals from the readback signals. When crossover detection is utilized, the switch 178 is closed to short out the diodes 174 and 176. The amplitude and phase compensated output signals of the amplifier 154 are to a detector 190 where, for example, the peaks in the readback signal may be detected.

OPERATION

When the polarized storage medium 12 is run in the forward direction, as shown by the arrow 16 in FIG. 1, the magnetic transducing head 20 detects all the transitions in polarization that represent the data recorded on the medium 12. Each readback pulse exhibits phase distortions distortions caused by electrical and mechanical imperfections in the system 10. The forward readback pulse 24, as shown by the pulse 24 in FIG. 2, exhibits phase distortion in the trailing edge 28 thereof. The readback signal is amplified in the preamplifier 52 before application to the bidirectional phase shifter 50. Simultaneously, a forward direction read signal is applied to the input terminal 100 of the switching circuit 80 to activate the transistor 88 thereof. Prior to the conduction of either of the transistors 88 and 90, the junction points 82 and 84 of the bidirectional phase shifter 50 are below ground potential. When the transistor 88 conducts and saturates, the collector thereof is clamped close to ground and so is the junction point 84. When the junction point 84 jumps to ground potential, the diodes 74 and 76 become back biased and the reverse direction phase shift circuit 67 is effectively switched out of the bidirectional phase shifter 50. The phase of the forward readback signal is therefore affected only by the inductor 62 and the potentiometer 68 in the forward direction phase shift circuit 65. The potentiometer 68 is adjusted to exhibit a high resistance so that the forward phase shift circuit 65 in combination with the amplitude compensator 12 exhibits the phase characteristic 36 in FIG. 4. This characteristic shifts the phase of the readback signals in one polarity, or sense or die direction. The combination of the characteristic 36 with its mirror image 34 causes the readback system 10 to exhibit the overall linear phase shift characteristic 35 in FIG. 4. The forward readback pulses 28 are therefore rendered symmetrical about their center points 30, as shown by the dashed pulse 31 in FIG. 2. Although the potentiometer 68 exhibits a high resistance to accomplish such phase come compensation, it is still capable of further adjustment so that as the transducer head 20 wears out, periodic adjustments permit the useful life of the transducer head to be extended greatly.

When the polarizable storage medium 12 is driven in the opposite direction, the transistor 88 is biased to cutoff and the transistor 90 is saturated by a reverse direction signal applied to the base electrode thereof. The transistor 90 clamps the junction point 82 close to ground and back biases the diodes 70 and 72. The potentiometer 68 and hence the forward direction phase shift circuit 65 is therefore switched out of the signal path. The diodes 74 and 76 are forward biased, and the reverse direction phase shift circuit 67 is switched into the circuit. The reverse readback signals exhibit substantially the opposite phase shift to the forward readback signal and consequently the potentiometer 69 is adjusted to a low resistance so that the phase characteristic of the reverse direction phase shift circuit 67 and the amplitude compensator 120 in combination is similar to that as so shown by the characteristic 46 in FIG. 5. This characteristic shifts the phase of the reverse readback signals in an opposite polarity or direction to the forward readback signals. A substantially linear overall reverse phase characteristic 47 therefore results. A reverse readback pulse such as the pulse 39 is therefore made symmetrical about its center point. The overall phase characteristic curve 47 for the reverse direction does not provide as good a compensation as the overall phase characteristic 35 for the forward direction. Complete phase compensation in the reverse direction would occur if the phase shift introduced into the system 10 is a mirror image of the phase distortion characteristic 44 in the reverse direction. In such a case, both the phase distortion characteristics 44 and its mirror image phase characteristic would combine into an overall linear phase characteristic. A circuit which exhibits a mirror image phase characteristic is the reverse phase shift circuit 67 alone. Thus, if the amplitude compensator 120 is not included in reverse direction operation, then substantially complete compensation is provided by the reverse phase shift circuit 67 alone.

In forward direction operation, however, the absence of the amplitude compensator 120 causes the forward direction phase shift circuit 65 to exhibit a phase shift of the same polarity as the phase shift of the reverse phase shift circuit 67. Such a characteristic would not be a mirror image of the forward distortion characteristic 34 and hence complete compensation in the forward direction would not be provided if the amplitude compensator 120 is absent from the system 10.

The phase equalized signals derived from the phase compensator 50 are applied to the amplitude compensator 120 and the phase and amplitude compensated readback signals derived from the amplitude compensator 120 are coupled to the gain control amplifiers 122 and 124. The amplifiers 122 and 124 cause the forward and reverse readback signals to be amplified by different amounts so that the reverse readback signals exhibit the same amplitude as the forward readback signals.

One or the other of the forward and reverse readback signals are applied through switches 150 and 152, respectively, to the polarity sensitive differential amplifier 154. The amplifier 154 equalizes the amplitudes positive and negative excursions of the readback signals. Consequently, the readback signals derived from the amplifier 154 are all equalized with respect to each other, regardless of polarity or the direction the medium 12 is driven. The equalized signals are applied to the detector 190.

Thus in accordance with the invention, a readback system exhibits high performance and long life by performing phase and amplitude compensation on the forward and reverse readback signals therein. This permits the recordings on the so storage medium to be packed very densely without inaccurate readings occurring. The system also permits the phase of the readback signals to be continuously adjustable to provide phase compensation notwithstanding continuity wear of the transducers. This feature permits the extension of the useful life of the transducers.

I claim:

1. In a readback circuit for reading in forward and reverse directions data stored on a polarizable storage medium to obtain forward and reverse readback signals, the combination comprising:

first means including a first phase shift circuit coupled to shift the phase of said forward readback signal in one sense; and second means including a second phase shift circuit coupled to shift the phase of said reverse readback signal in the opposite sense.

2. A readback system in accordance with claim 1 wherein said first and second means include first and second phase shift circuits coupled to an amplitude booster network.

3. A readback system in accordance with claim 1 wherein said first and second (means include first and second) phase shift circuits are coupled to an amplitude booster network.

4. The combination as set forth in claim 3 wherein said resistive circuit elements in said first and second phase shift circuits are effectively connected in parallel with each other to comprise first and second parallel resistive branches respectively.

5. The combination as set forth in claim 3 wherein said reactive circuit element comprises a single inductor coupled in common to said first and second parallel resistive branches to be common to both of said phase shift circuits.

6. The combination as set forth in claim 5 that further includes a switching circuit coupled to connect said inductor to said first phase shift circuit for forward readback signals and to connect said inductor to said second phase shift circuit for reverse readback signals.

7. The combination as set forth in claim 6 wherein said resistive circuit element in said first phase shift circuit is variable and selected to exhibit a high resistance and said resistive circuit element in said second phase shift circuit is variable and selected to exhibit a low resistance.

8. The combination as set forth in claim 7 that further includes a polarity sensitive amplifier for amplifying said forward and reverse readback signals so that positive and negative polarity alternations thereof exhibit substantially identical amplitudes.

9. In a readback circuit for reading, in forward and reverse directions, data stored on a polarizable storage medium by transitions in the polarization of said medium, the combination comprising:

a transducer coupled to detect said transitions in polarization in said medium to provide forward and reverse readback signals corresponding to reading said forward and reverse directions, respectively;

said readback signals exhibiting undesired phase shifts; and bidirectional phase compensation means coupled to said transducer for shifting the phase of said forward readback signals in one direction and for shifting the phase of said reverse readback signals in the opposite direction.

10. A readback circuit in accordance with claim 9 wherein said bidirectional phase compensation means include first and second phase shift circuits and said readback circuit further includes switching means for coupling said first phase shift circuit to said transducer for said forward readback signals and for coupling said second phase shift circuit to said transducer for said reverse readback signals.

UNITED STATES PATENT OFFICE
CERTIFICATE OF CORRECTION

Patent No. 3,568,174 Dated March 2, 1972

Inventor(s) George V. Jacoby & Joseph D. Gleitman

It is certified that error appears in the above-identified patent and that said Letters Patent are hereby corrected as shown below:

Column 7, lines 26 through 28, "2. A readback sys in accordance with claim 1 wherein said first and second include first and second phase shift circuits coupled to amplitude booster network." should read ---2. A readback system in accordance with claim 1 wherein said first and second phase shift circuits are coupled to an amplitude booster network.---.

Column 7, lines 29 through 31, "3. A readback sys in accordance with claim 1 wherein said first and second (means include first and second) phase shift circuits are coupled to an amplitude booster network." should read ---3. A readback system in accordance with claim 2 where said first and second phase shift circuits each comprise combination of a reactive circuit element and a resistive circuit element.---.

Signed and sealed this 7th day of November 1972.

(SEAL)
Attest:

EDWARD M.FLETCHER,JR.
Attesting Officer

ROBERT GOTTSCHALK
Commissioner of Pat